Aug. 26, 1969 — R. H. DAY — 3,463,266
EXTENSIBLE ESCAPE SLIDE
Filed April 29, 1968 — 3 Sheets-Sheet 2
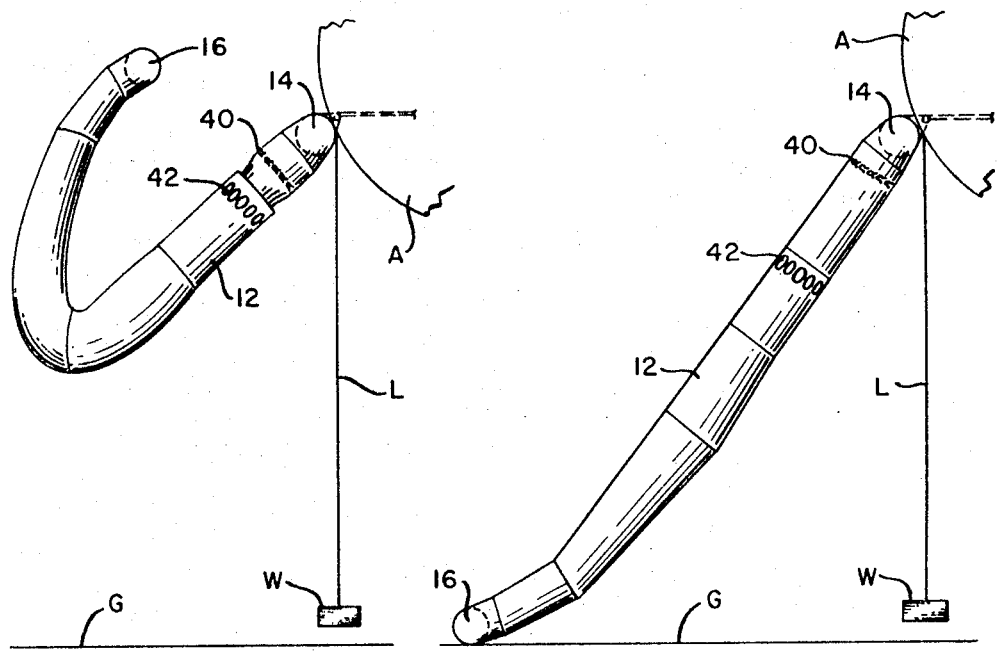
FIG-3-A  FIG-3-B
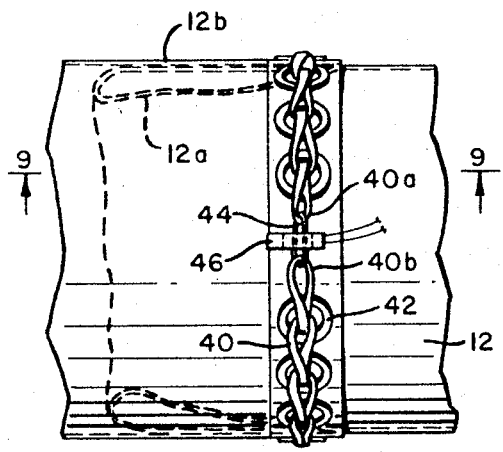 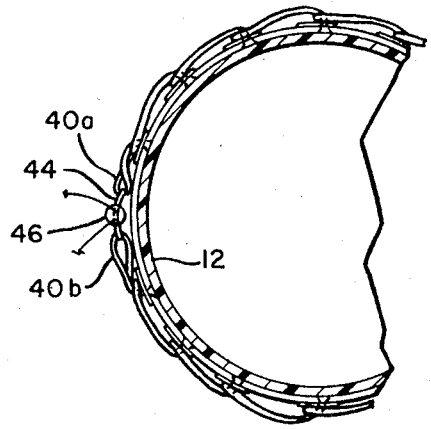
FIG-4  FIG-5
INVENTOR.
RONALD H. DAY
BY Gregg & Stidham
ATTORNEYS Aug. 26, 1969
R. H. DAY
3,463,266
EXTENSIBLE ESCAPE SLIDE
Filed April 29, 1968
3 Sheets-Sheet 3
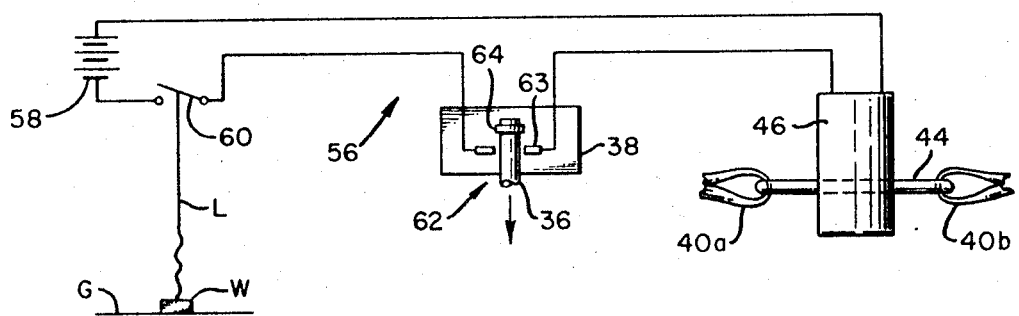
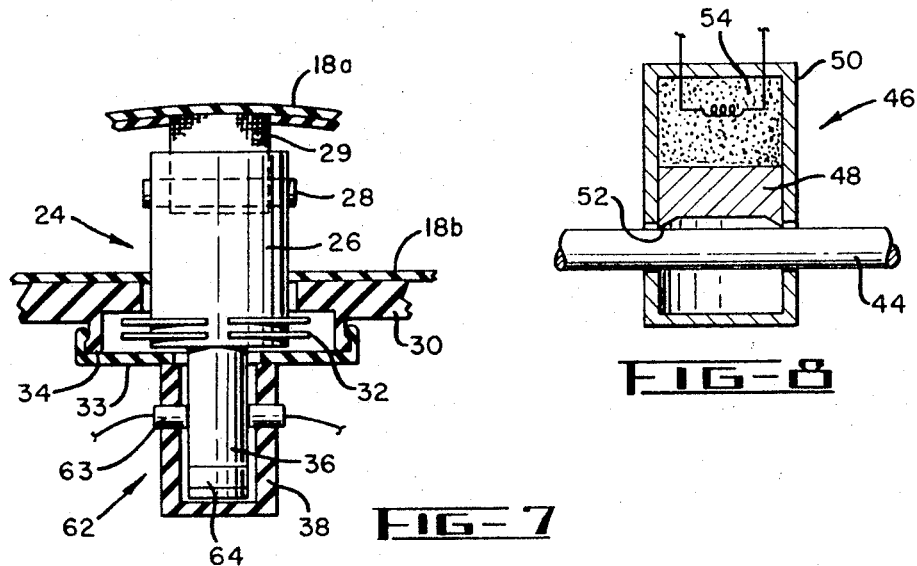
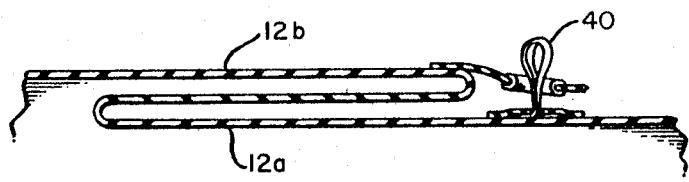
INVENTOR.
RONALD H. DAY
BY *Gregg & Stidham*
ATTORNEYS _United States Patent Office_

3,463,266
Patented Aug. 26, 1969

3,463,266
EXTENSIBLE ESCAPE SLIDE
Ronald H. Day, Mill Valley, Calif., assignor to Industrial Covers, Inc., San Francisco, Calif., a corporation of California
Filed Apr. 29, 1968, Ser. No. 724,732
Int. Cl. A62b 1/20; B65g 11/10
U.S. Cl. 182—48                      8 Claims

ABSTRACT OF THE DISCLOSURE

An extensible escape slide having inflatable, tubular side beams with a portion of each beam being normally tucked and nested within an adjacent portion to shorten the beams. The nested portions of the beams are tied together by a series of interlocking tie links which are released in response to operation of an excess height indicator so that when the beams are inflated the nested portions extend to full length. A weighted line closes a normally open switch when under tension to energize a device for releasing the interlocking tie links as by severing a key link. Another normally open switch is closed momentarily during inflation long enough to energize the releasing means only if the other switch is closed, and thereafter remains open so that the releasing means cannot thereafter be energized inadvertently.

Description

This invention relates to an extensible escape slide and, more particularly, to an escape slide with inflatable side beams which extend to extra length in the event that the compartment being evacuated is at abnormally great height.

In the case of crash landings or other aircraft emergencies away from the airport terminal building, it is highly desirable to evacuate the passengers as quickly as possible and, for this purpose, escape slides are provided to enable the passengers to jump from an elevated fuselage without injury. Such escape slides may take the form of a flexible sheet member extended across extensible, tubular side beams which, when inflated, function as load-carrying structural beams and which, when deflated, may be folded and packed into a compact mass with minimum space requirements.

Where an aircraft has a relatively short fuselage, particularly in most propeller driven planes, the height of the exits from which an evacuation is being effected will not vary too greatly over a wide range of angles in which the fuselage may be disposed. However, in the case of jet aircraft of ever increasing lengths a variation in the angle at which the fuselage is disposed may result in a wide disparity in the height of the escape exit. For example, if the forward or nose landing gear collapses, the nose of the aircraft drops and the fuselage pivots about the main landing gear so that an escape exit located at the tail of the plane may be elevated several feet. Consequently, an escape slide which is disposed at the proper angle for rapid but safe evacuation at normal height may become much too steep for safety evacuation from the elevated exits.

It is, therefore, an object of this invention to provide an extensible escape slide having inflatable side beams which are normally fore-shortened in length but which may be extended when additional length is required.

It is a further object of this invention to provide an aircraft escape slide which is extended in length automatically when the escape exit is at abnormally great height.

It is a further object of this invention to provide a height sensing device which would detect and indicate the disposition of an aircraft escape exit at abnormally great height.

It is a further object of this invention to provide a device which operates to extend an escape slide upon detection of an abnormally great height which is itself rendered inoperative at normal escape exit heights.

In carrying out this invention, I provide an escape slide having inflatible, tubular side beams with a flexible sheet member extended between them to form a slide surface. Corresponding portions of the tubular beams are tucked and nested inside adjacent portions with the portions drawn together axially and secured by releasible tie means. A releasing device may be energized to release the tie means when greater slide length is required whereby the nested portions of the tubular beams extend to their full lengths when inflated. The releasing means is energized by a normally open switch which is closed by a weighted line secured to it under tension. As a safety feature, another normally open switch is closed during inflation of the slide and is again opened as inflation progresses. Hence, in the event that the first switch is not closed by the weighted line, the second switch inactivates the circuit to prevent operation of the releasing means even if the line is thereafter tensioned inadvertently.

Other objects and advantages of this invention will become apparent from the description following when read in conjunction with the accompanying drawings wherein:

FIGS. 3A and 3B illustrate inflation of the slide into distended disposition when the aircraft is located at abnormally great heights;

FIG. 4 is a partial side view of an inflatable beam of the escape slide showing tie means for holding it in foreshortened disposition;

FIG. 5 is a partial section view of the side beam showing the tie means;

FIG. 6 is a circuit diagram showing schematically the means for releasing the tie device;

FIG. 7 is a partial section view showing a switch mechanism employed in the circuit of FIG. 6;

FIG. 8 is a section view showing one form of releasing means; and

FIG. 9 is a partial section view taken along line 9—9 of FIG. 4.

Figure 1:
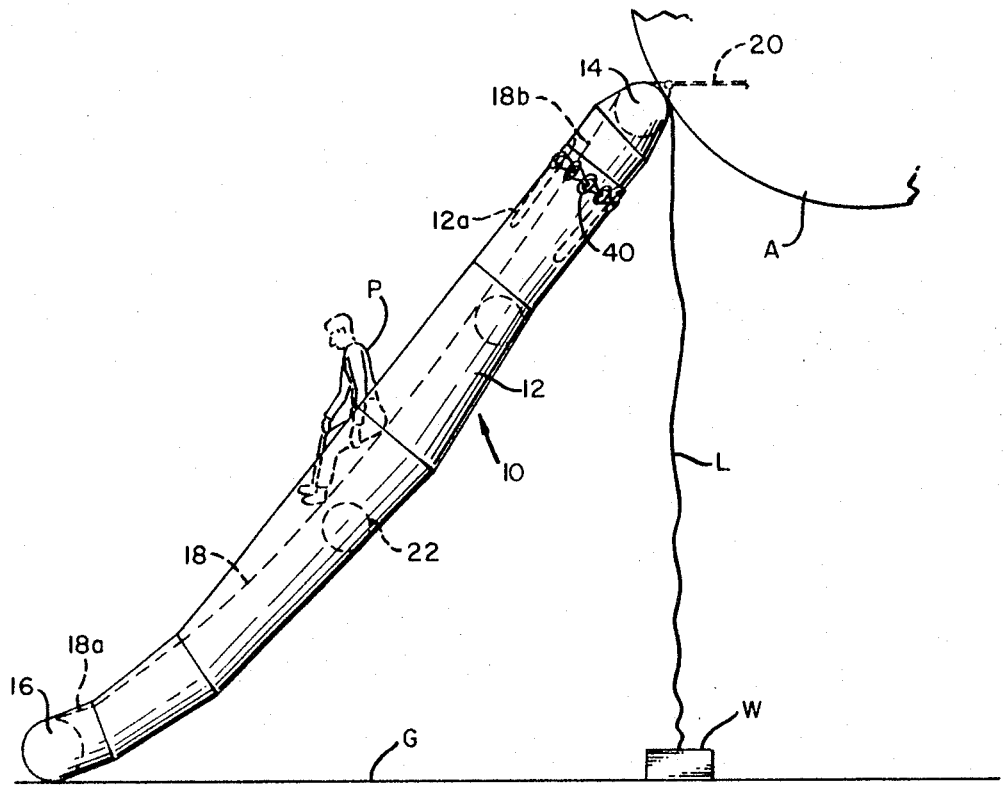
FIG. 1 is a side elevation of an escape slide in use.

Referring now to the drawings with greater particularity there is shown in FIG. 1 an escape slide 10 including two or more longitudinal inflatable beams 12 and top and bottom cross inflatable bearing members 14 and 16, which together carry a flexible sheet 18 which functions as the slide surface for evacuation of a passenger P from an aircraft A to the ground level G. The slide is firmly anchored at its upper end 14 to the aircraft A by any suitable means such as a strap 20 of substantial tensile strength, and the upper cross-bearing member 14 bears against the side of the aircraft when inflated to support the slide against lateral deflection fore and aft of the aircraft. If desired, additional cross beams 22 may be provided to increase overall strength of the slide and to hold the longitudinal beams in proper relative disposition.

Figures 2A, 2B:
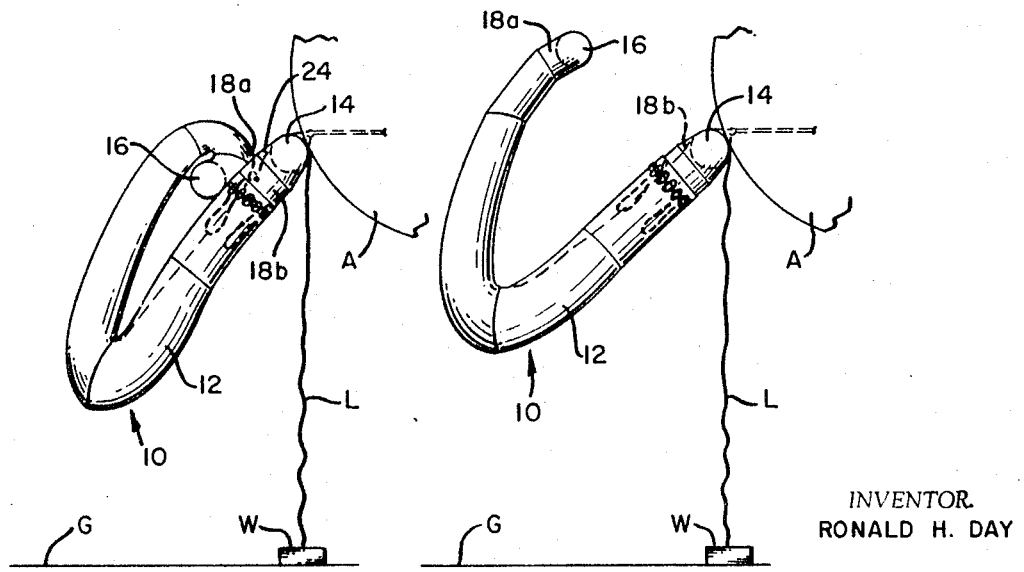
FIGS. 2A and 2B illustrate the inflation of the slide when the aircraft is disposed at normal heights for evacuation.

In order to prevent a limp, uninflated escape slide from being blown under the aircraft by a cross wind so that it cannot slope outward of the aircraft when inflated, i.e. toward the left in FIG. 1, I provide suitable means shown generally at 24 for releasably securing the lower end 18a of the slide surface 18 to the upper end 18b until the beams are partially inflated. This is illustrated in FIGS. 2A and 2B wherein the lower ends of the beams 12 are held clear of the ground G until inflation commences and the beams tend to swing outward from the aircraft (clockwise in FIG. 2A) as the upper cross beam inflates and presses firmly against the aircraft A. Then, as shown in FIG. 2B, the lower end is released to swing in a counter-clockwise direction into the position of FIG. 1.

Suitable means for temporarily holding the slide in overlapped disposition until inflation commences are illustrated and described in my United States Patent No. 3,391,771 dated July 9, 1968, and are further illustrated in FIG. 7. There, a cylindrical male component 26 is secured to the underside of the slide surface sheet 18a as by means of a pin 28 securing it to a loop member 29 which, in turn, is bonded to the sheet. The male member extends through the upper portion 18b (FIG. 2A) of the slide surface sheet and through a female member 30 which is securely bonded to the underside of the slide sheet 18b. The male member 26 is releasably held within the female component 30 by means of friction gripping rings 32 such as those marketed under the trademark "Grip Ring." A cover of closure member 33 may be snapped over the complementary lips 34 of the female member so as to enclose the gripping rings and retain them even when the male member 26 is pulled free of them. Extending from the end of the cylindrical male member and from the cover member are components 36, 38 of an electric switch hereinafter to be described.

As shown most clearly in FIGS. 4, 5 and 9, the tubular beams 12 are normally foreshortened by tucking and nesting a portion 12a of the beam into an adjacent portion 12b and then securing the portions 12a and 12b together by releasable means. The securing means may comprise a series of loops 40 secured on one portion 12a of the beam and extend through the openings in grommets 42 on the adjacent portion 12b of the beam and then through an adjacent loop 40, thus constituting a continuous chain resembling a lock stitch which, when severed at one link is progressively released around the circumference of the beam. In the preferred embodiment illustrated, two adjacent loops 40a and 40b are tied together by an interconnecting key link 44 which extends through a severing device 46 so that when the key link is severed the remaining loops are released progressively around each beam 12 and, during the course of inflation, the beams unfold under the pressure of the expanding gas to their extended lengths as shown in FIGS. 3A and 3B.

As shown in FIG. 8, the severing device 46 may comprise a piston 48 slidable within a cylinder 50 through which the interconnecting key link 44 is extended. The piston has a cutting edge 52 which severs the interconnecting link when the piston is driven downward. Carried within the cylinder is an explosive charge 54 which may be detonated by a sparking device which, when energized by the electrical circuit 56 shown in FIG. 6, explodes the powder and drives the piston down to sever the interconnecting key link 44.

Referring now to FIG. 6, the electrical circuit comprises a suitable source of current such as a battery 58 and a normally open switch 60 adapted when closed to energize the severing device 46 to sever the key link 44 between loops 40a and 40b. In addition, the circuit 56 includes a second normally open switch 62 comprising stationary contacts 63 and a movable bridging contact 64 which closes the switch momentarily and then opens it again. One form of open-close-open switch is shown more specifically in FIG. 7 wherein the stationary contacts 62 are carried on the housing extension 38 on the cap or closure member 33 of the female holding component previously described. The movable bridge contact 64 is carried on the cylindrical extension 36 of the male holding member 26. Hence, after inflation of the tubular beam is under way and the friction gripping rings 32 are overcome the extension 36 is pulled between the contacts 63 until bridge contact 64 closes the switch 62 momentarily. If at that time the other normally open switch 60 is closed, the firing device 54 is energized to sever the interconnecting key link 44. If the switch 60 is not closed, the mechanism does not fire and it cannot thereafter be fired inadvertently inasmuch as the second switch 62 remains open with separation of the releasable holding means 32.

Preferably, the mechanism for severing the key link 44 and extending the tubular beams 12 is energized automatically in response to means for detecting abnormally high disposition of the arcraft A. Such means may comprise a line secured to the switch 60 with a weight at the other end so that when the line is under tension with the weight above the ground G as shown in FIGS. 3A and 3B the switch 60 is closed to extend the tubular beams.

In operation, the slide 10 and weight W are dropped out of the aircraft A at the same time and the inflating system (not shown) is actuated. If the weight W reaches the ground G before the line is tensioned, the slide will open to the configuration shown in FIGS. 1, 2A and 2B and once the releasable means 24 of FIG. 7 have become separated the open-close-open switch 62 remains open and the firing mechanism thereafter cannot be energized, even though the line L is inadvertently tensioned. If, on the other hand the weight W does not reach the ground, the line L is tensioned; the switch 60 is closed; and as the releasing means 62 separates, the bridging contact 64 moves through contact with the stationary contacts 63 to complete the circuit momentarily and energize the firing means 54. This drives the piston 48 (FIG. 8) down to sever the interconnecting key link and allows the tubular beams 12 to extend to full length as shown in FIGS. 3A and 3B.

While this invention has been described in connection with a preferred embodiment thereof, it is obvious that modifications and changes therein may be made by those skilled in the art without departing from the spirit and scope of this invention as defined by the claims appended hereto.

What is claimed as invention is:

1. An inflatable escape slide comprising:
   a pair of generally parallel tubular side beams and at least one interconnecting transverse member providing continuous communication,
   releasable means normally holding said beams in foreshortened disposition, and
   selectively operated means for releasing said holding means so that inflation of said beams extends them into lengthened disposition.

2. The inflatable escape slide defined by claim 1 wherein:
   a portion of the length of each of said side beams is normally tucked within an adjacent portion thereof.

3. The inflatable escape slide defined by claim 2 including:
   a series of interlocking tie links securing said portions together around each of said side beams, and
   means for severing the connection between a pair of said links to enable a progressive release of said series thereof around each of said side beams.

4. The inflatable escape slide defined by claim 1 including:
   means for determining when the top of said slide is above a predetermined height, and
   means operated in response to said determining means for releasing said holding means when said predetermined height is exceeded.

5. The inflatable slide defined by claim 4 wherein the last named means comprises:
   electrically operated means for releasing said holding means,
   an electric circuit including said releasing means, and
   a normally open switch in said circuit,
   and said height determining means comprises a tension member connected at one end to said switch and operative when under tension to close said switch, and a weight carried on the other end of said tension member.

6. The inflatable slide defined by claim 5 including: a second normally open switch in said circuit, complementary elements of said second switch being carried on portions of said slide to close said switch momentarily and then open it in response to inflation of said slide.

7. An inflatable escape slide comprising:
a pair of generally parallel tubular side beams,
a slide sheet secured to and between said beams, and
means for determining when the top of said slide is above a predetermined height comprising electrically operated means operative when energized to indicate that said predetermined height is exceeded,
an electric circuit including said electrically operated means,
a normally open switch in said circuit, a tension member connected at one end to said switch and operative when under tension to close said switch, and a weight carried on the other end of said tension member.

8. The inflatable slide defined by claim 7 including a second normally open switch in said circuit,
complementary elements of said second switch being carried on portions of said side to close said switch momentarily and then open it in response to inflation of said slide.

References Cited

UNITED STATES PATENTS

| | | | |
|---|---|---|---|
| 3,070,203 | 12/1962 | Hailstone | 182—48 |
| 3,102,623 | 9/1963 | Schacht et al. | 182—48 |
| 3,391,771 | 7/1968 | Day | 193—25 |

REINALDO P. MACHADO, Primary Examiner

U.S. Cl. X.R.

193—25